(12) United States Patent
Chambers et al.

(10) Patent No.: US 7,875,105 B2
(45) Date of Patent: Jan. 25, 2011

(54) OXYGEN CONCENTRATOR HAVING STRUCTURAL SIEVE BEDS

(75) Inventors: William M. Chambers, Grafton, OH (US); Dennis J. Sniezek, Elyria, OH (US); Thomas B. Sprinkle, Rocky River, OH (US)

(73) Assignee: Invacare Corporation, Elyria, OH (US)

( * ) Notice: Subject to any disclaimer, the term of this patent is extended or adjusted under 35 U.S.C. 154(b) by 684 days.

(21) Appl. No.: 11/835,705

(22) Filed: Aug. 8, 2007

(65) Prior Publication Data
US 2008/0034975 A1 Feb. 14, 2008

Related U.S. Application Data

(60) Provisional application No. 60/821,807, filed on Aug. 8, 2006, provisional application No. 60/821,784, filed on Aug. 8, 2006.

(51) Int. Cl.
*B01D 53/02* (2006.01)
(52) U.S. Cl. .................. 96/147; 96/151; 128/205.12; 128/205.27

(58) Field of Classification Search ............... 95/96; 96/147, 130, 151; 128/205.12, 205.27
See application file for complete search history.

(56) References Cited

U.S. PATENT DOCUMENTS

| | | | |
|---|---|---|---|
| 4,449,990 A | 5/1984 | Tedford, Jr. | |
| 5,906,672 A | 5/1999 | Michaels et al. | |
| 5,917,135 A | 6/1999 | Michaels et al. | |
| 5,988,165 A | 11/1999 | Richey, II et al. | |
| 7,156,903 B2 * | 1/2007 | McCombs | 96/109 |

OTHER PUBLICATIONS

Invacare Corporation, Parts Catalog, Oxygen Concentrators ( Plat. 5LX, Non Plat. 5LX and 10 Liter), 60 pages, issued Jul. 26, 2006.
Invacare Corporation, Operator's Manual, Platinum Series, XL, 5, 10, 40 pages, Rev G—Mar. 23, 2006.

* cited by examiner

*Primary Examiner*—Robert A Hopkins
(74) *Attorney, Agent, or Firm*—Calfee Halter & Griswold LLP

(57) ABSTRACT

Embodiments of oxygen concentrators having a sieve bed that includes a vessel filled with a separation medium are disclosed. The sieve bed vessel at least partially supports one chassis component of the oxygen concentrator with respect to another chassis component. of the oxygen concentrator.

11 Claims, 19 Drawing Sheets

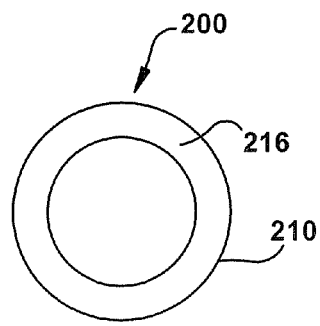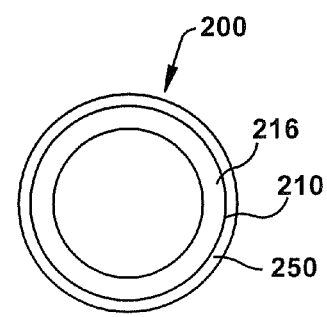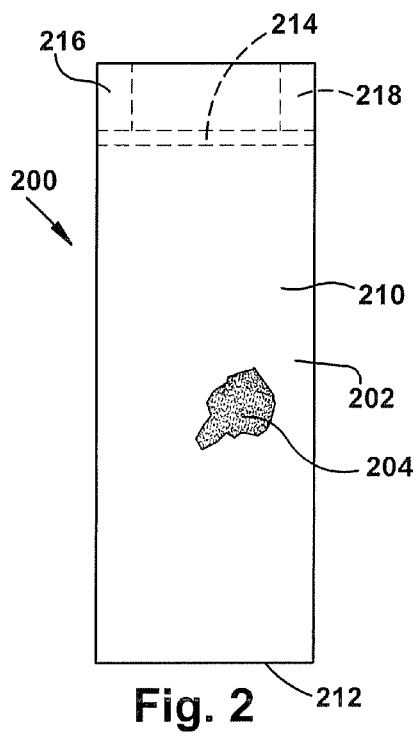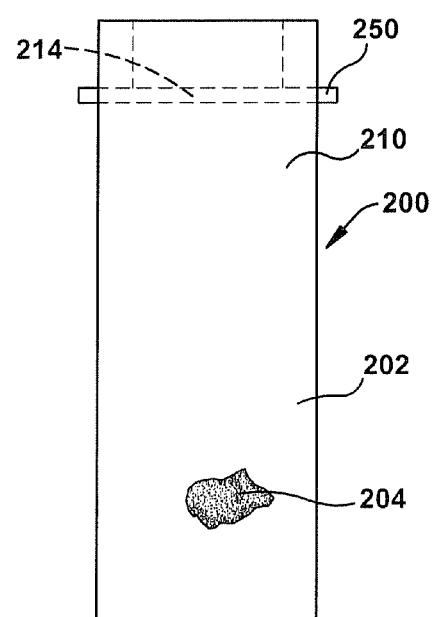

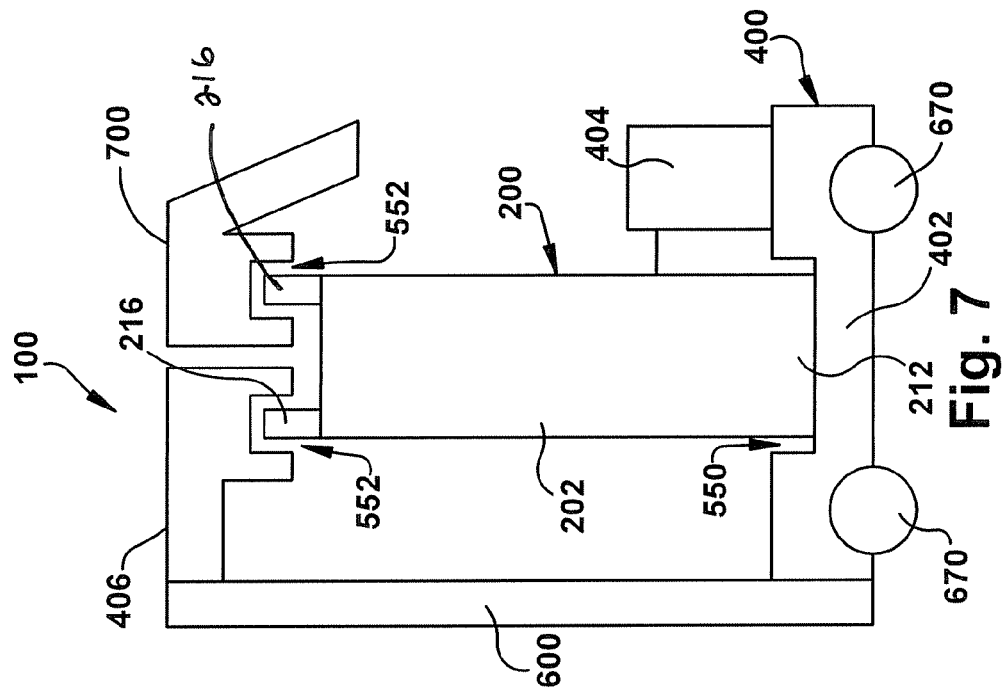
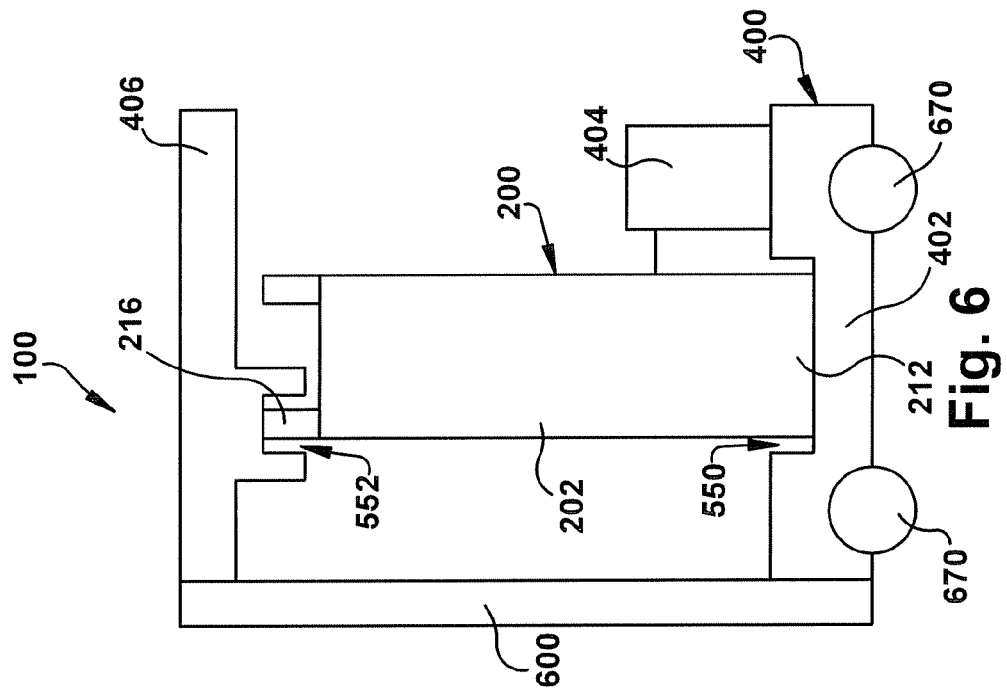

OXYGEN CONCENTRATOR HAVING STRUCTURAL SIEVE BEDS

RELATED APPLICATIONS

This application claims the benefit of provisional application Ser. No. 60/821,807, entitled "Oxygen Concentrator Having Structural Sieve Beds," filed on Aug. 8, 2006 and the benefit of provisional application Ser. No. 60/821,784, entitled "Oxygen Concentrator Having Low Vibration Compressor," filed on Aug. 8, 2006. Provisional application Ser. Nos. 60/821,807 and 60/821,784 are incorporated herein by reference in their entirety.

BACKGROUND

Various applications exist for the separation of gaseous mixtures. For example, the separation of nitrogen from atmospheric air can provide a highly concentrated source of oxygen. These various applications include the provision of elevated concentrations of oxygen for medical patients and flight personnel. Hence, it is desirable to provide systems that separate gaseous mixtures to provide a concentrated product gas, such as a breathing gas with a concentration of oxygen.

Several existing product gas or oxygen concentrators, for example, are disclosed in U.S. Pat. Nos. 4,449,990, 5,906,672, 5,917,135, and 5,988,165 which are commonly assigned to Invacare Corporation of Elyria, Ohio and fully incorporated herein by reference.

SUMMARY

An oxygen concentrator having, for example, a sieve bed that includes a vessel filled with a separation medium. The sieve bed vessel at least partially supports one chassis component with respect to another chassis component of the oxygen concentrator.

BRIEF DESCRIPTION OF DRAWINGS

FIG. 2 is a schematic illustration of one embodiment of a sieve bed vessel;

FIG. 2A is a schematic illustration of one embodiment of a sieve bed vessel with a rim that includes a radially outward extending protrusion;

FIG. 3 is a view taken along lines 3-3 in FIG. 2;

FIG. 3A is a view taken along lines 3A-3A in FIG. 2A.

FIG. 6 illustrates an exemplary embodiment of a sieve bed vessel that is captured between two chassis components that are coupled together;

FIG. 7 illustrates an exemplary embodiment of a sieve bed vessel having a rim disposed in a recess of a first chassis component and in a recess of a second chassis component;

DETAILED DESCRIPTION

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Figure 1:
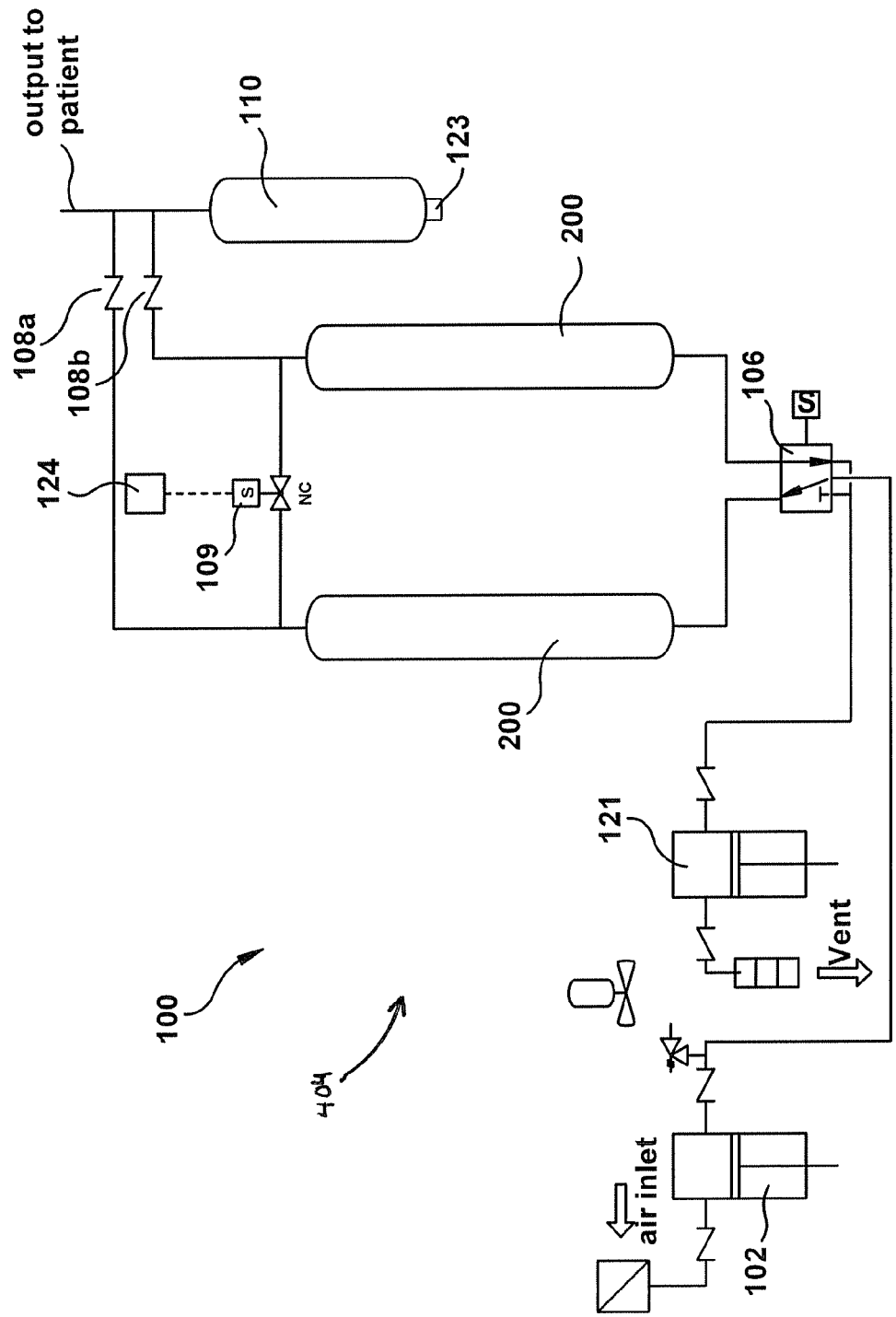
FIG. 1 is a schematic illustration of an embodiment of an oxygen concentrator.

Referring to FIG. 1, an oxygen concentrator 100 includes functional devices 404 that operate to concentrate oxygen from air. Some of the functional devices 404 have both functional components and structural components. For example, a sieve bed 200 includes a structural sieve bed vessel 202 that contains a functional sieve bed separation medium (See FIG. 2). The functional devices 404 are mounted or packaged in a chassis. In this application, "chassis components" are components that support and/or at least partially cover one or more of the functional devices 404 of the oxygen concentrator. In one exemplary embodiment, a structural component of a functional device 404 of the oxygen concentrator at least partially supports one chassis component of an oxygen concentrator with respect to another chassis component of the oxygen concentrator. For example, oxygen concentrators 100 with one or more sieve beds 200 that are used as structural components of a chassis 400 of the oxygen concentrator are disclosed herein. The features described herein, either individually, in combination, or sub-combinations of the features can be implemented in a wide variety of different oxygen concentrators. The disclosed features can be used to mount a sieve bed in any oxygen concentrator, including but not limited to, the oxygen concentrators disclosed in U.S. Pat. Nos. 4,449,990, 5,906,672, 5,917,135, and 5,988,165, which are hereby fully incorporated by reference.

FIG. 1 illustrates the functional devices of one example of an oxygen concentrator 100 that can utilize the sieve beds 200 as structural components. The embodiment of the oxygen concentrator 100 shown in FIG. 1 includes two sieve beds 200. However, any number of sieve beds 200 can be used. For example, one sieve bed may be used, two sieve beds may be used, three sieve beds may be used, or more than three sieve beds may be used. Referring to FIGS. 2 and 3, each sieve bed includes a vessel 202 that is filled with a physical separation medium or material 204. The separation material 204 selectively adsorbs one or more adsorbable components of a gaseous mixture and passes one or more nonadsorbable components of the gaseous mixture through the vessel 202. The separation material 204 of one embodiment is a molecular sieve with pores of uniform size and essentially the same molecular dimensions. However, any separation material may be used. These pores selectively adsorb molecules in accordance with molecular shape, polarity, degree of saturation, and the like. In the preferred embodiment, the physical separation medium is an aluminasilicate composition with 4 to 5 angstrom pores. More specifically, the molecular sieve, may be a sodium or calcium form of aluminasilicate, such as type 5A zeolite. Alternately, the aluminasilicate may have a higher silicon to aluminum ratio, larger pores, and an affinity for polar molecules, e.g. type 13x zeolite. The zeolites adsorb nitrogen, carbon monoxide, carbon dioxide, water vapor, and other significant components of air.

Referring to FIGS. 2 and 3, the sieve bed vessel 202 can take a wide variety of different forms. Any vessel capable of containing fluid under a pressure needed to force a gaseous mixture, such as air, through the separation medium 204 can be used. For example, the sieve bed vessel can be any vessel that can be pressurized to 20 to 30 psi. The sieve bed vessel 202 can be formed in a wide variety of different shapes and sizes. In the example illustrated by FIGS. 2 and 3, the sieve bed vessel 202 is cylindrical with a circular cross-section. However, a cylindrical vessel can have any cross-section, such as oval, polygonal, etc. The sieve bed vessel illustrated by FIGS. 2 and 3 has a cylindrical wall 210, a bottom end 212, and a top end plate 214. A rim 216 is defined around the top end plate 214. The rim 216 can take a wide variety of different forms. In the example illustrated by FIGS. 2 and 3, the rim 216 is defined by a generally straight axially extending cylindrical wall 218. In the example illustrated by FIGS. 2A and 3A, the rim 216 includes a radially outward extending protrusion 250 or bump. The vessel 202 can be made from a wide variety of different materials. Examples of materials that the vessel 202 can be made from include, but are not limited to, metals, such as aluminum, steel, and other alloys, plastics, and carbon fiber. Any material can be used that meets the pressure containment requirements of the sieve bed.

In the example illustrated by FIG. 1, a cross-over valving arrangement 106 selectively connects each one of the beds with a source of the gas mixture, e.g. air under pressure, and the other bed with a negative pressure or vacuum. In one embodiment, the cross-over valving arrangement selectively connects one of the beds with an air pump or compressor 102 which supplies air under pressure and the other bed with a vacuum pump 121 which draws a vacuum. The compressor and vacuum pump may be connected to a common drive motor. A solenoid or other cross-over valve actuating arrangement selectively causes the cross-over valving 106 to move alternately between first and second positions. In the first position, one sieve bed is connected with the compressor 102 and the other sieve bed is connected with the vacuum pump 121. In the second position, the connections of the sieve beds to the compressor 102 and the vacuum 121 are switched.

As the gas mixture is introduced under pressure through a bed inlet to an adsorbed gas-free or regenerated bed, an adsorption zone of finite, relatively large size is formed. This adsorption zone is a region of the bed in which the full capacity of the adsorbent to hold the adsorbable components has not been reached. The composition of the gas in the voids of the zeolite varies from substantially pure primary product gas at the outlet end to the ambient gaseous mixture composition at the inlet end. This adsorption zone moves from the bed inlet toward a bed outlet with a velocity significantly less than the superficial gas velocity in the bed and is dependent on the input gas pressure. When the adsorption zone reaches the outlet end of the bed, adsorbable components begin to flow through the bed outlet into the nonadsorbable primary product stream. This time is hereinafter referred to as the "breakthrough time". When breakthrough occurs, primary product enriched bed gas in the zeolite voids varies from a higher primary product gas concentration at the bed outlet to a lower concentration at the bed inlet. In the preferred embodiment the primary product enriched bed gas is about 80 percent primary product at breakthrough. While adsorption is occurring in one bed, the adsorbable components adsorbed by the separation medium of the other bed are purged or removed under vacuum in an exemplary embodiment.

In the example illustrated by FIG. 1, one sieve bed 200 is connected with a product tank 110 by way of a first check valve 108a or other unidirectional valving means. The first check valve 108a permits the primary product gas from the first sieve bed to flow into the product tank when product gas pressure in the first bed exceeds the pressure of product gas in the product tank. The first check valve 108a prohibits the product gas from flowing from the product tank 110 back into the sieve bed 200. The second sieve bed 200 is connected with the product tank 110 by way of a second check valve 108b or other unidirectional valving means. The second check valve 108b again provides for unidirectional flow of the primary product gas from the second bed 200 to the product tank 110.

In the example illustrated by FIG. 1, a pressure equalization flow path extends between a pair of outlets of the first arid second sieve beds. The flow path has a sufficient gas flow capacity such that when one bed is under full pressure and the other bed is under full vacuum, gas flow through the pressure equalization path substantially equalizes the bed pressures. In one embodiment, the flow path capacity is sufficient to bring the beds into pressure equilibrium in about 3 percent of the cycle duration or about 2 seconds. A pressure equalization valve 109 selectively permits and prevents a gas flow through the flow path between the first and second sieve beds 200. A timing and control means 124, which can be microprocessor-based, cyclically causes the cross-over valve actuating means 106 and the pressure equalization valve 109 to be operated. The timing and control means 124 includes a clocking means that periodically and cyclically enables a cross-over valve control and a pressure equalization valve control.

Referring again to FIG. 1, the product tank 110 maintains a reservoir of oxygen. The product tank output is monitored by a pressure transducer 123. FIG. 1 illustrates one of the wide variety of oxygen concentrator arrangements that can use one, two, or more sieve bed vessels as structural components. Sieve beds vessels can be used as structural members of any oxygen concentrator. Additional embodiments are disclosed in U.S. Pat. Nos. 4,449,990, 5,906,672, 5,917,135, and 5,988,165, which are hereby fully incorporated by reference.

Figure 4:
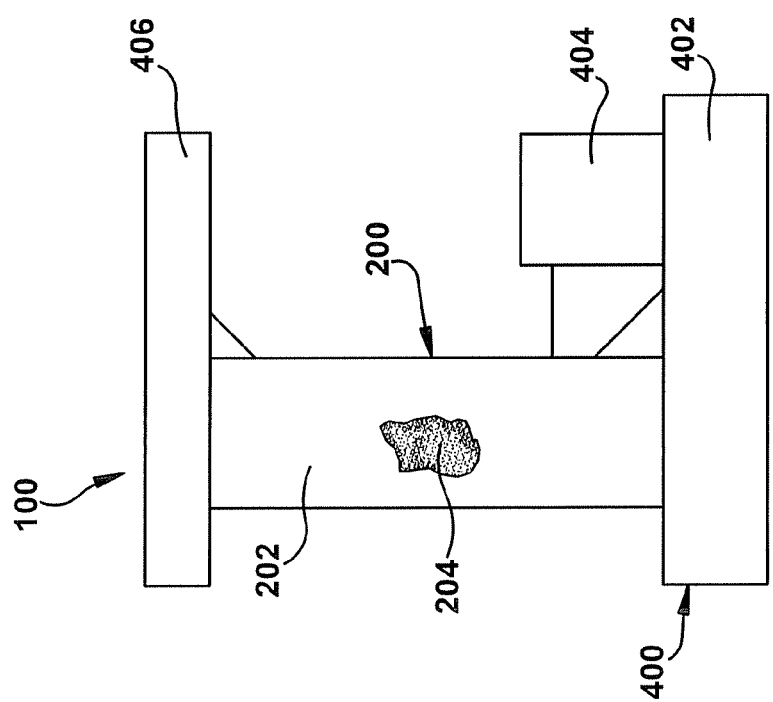
FIG. 4 is a schematic illustration of one embodiment where a sieve bed vessel that at least partially supports one chassis component with respect to another chassis component.

FIG. 1 is a schematic illustration that shows one example of how functional devices are interconnected in a way that facilitates concentration of oxygen from air. These functional devices are mounted or packaged in a chassis that houses the functional devices. The chassis may be configured in a wide variety of ways. Any chassis configuration that supports and houses the functional devices, may be used. FIG. 4 illustrates an oxygen concentrator 100 that includes a chassis 400. The chassis 400 includes a first or base chassis component 402 and a second or cover chassis component 406 disposed over at least a portion of the functional components 404 in an exemplary embodiment. The chassis 400 may include any number of chassis components. The chassis 400 supports functional devices 404, including at least one sieve bed 200. The sieve bed vessel 202 is assembled as a structural component that supports the chassis component 406 with respect to the chassis component 402. In one embodiment, the sieve bed vessel 202 is coupled to the chassis component 402 and to the chassis component 406. The sieve bed vessel 202 can be coupled to the chassis component 402 and to the chassis component 406 in a wide variety of different ways. The sieve bed vessel 402 can be coupled to the chassis components 402, 406 in any way that causes the sieve bed vessel 202 to support the chassis component 406 with respect to the chassis component 402. Examples of ways that the sieve bed vessel 402 can be coupled to one or more chassis components include, but are not limited to, attachment with mechanical fasteners, gluing, welding, threaded engagement between the vessel and a chassis component, and configuring a chassis component to fit onto a portion of the sieve bed vessel.

Figure 5:
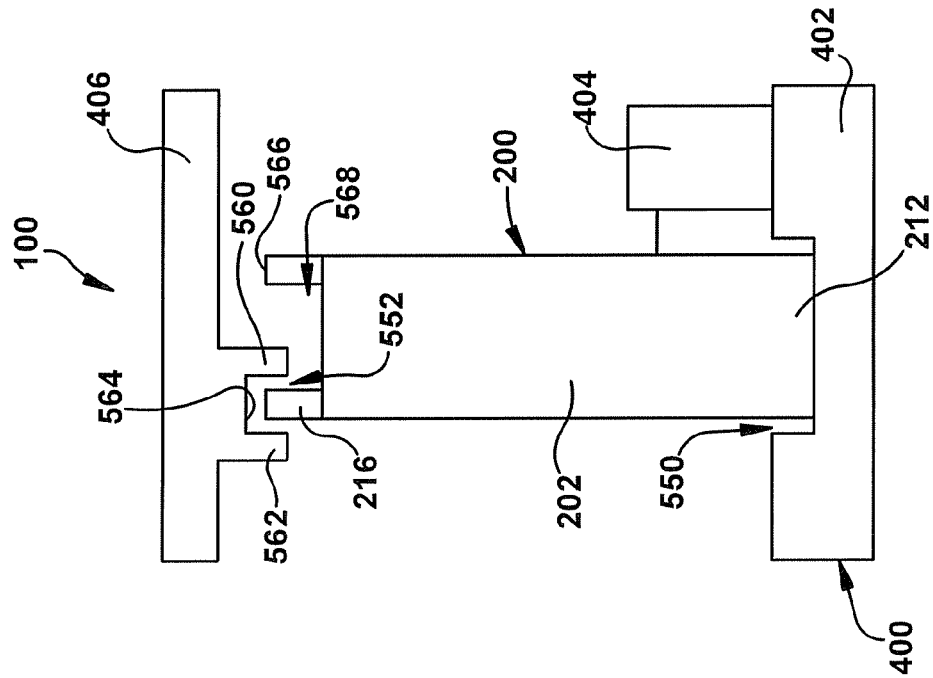
FIG. 5 illustrates an exemplary embodiment of a sieve bed vessel having a rim disposed in a recess of a chassis component.

FIG. 5 illustrates an example of an oxygen concentrator arrangement where a pocket 550 is defined by the base chassis component 402 and a recess 552 is defined by the second chassis component 406. The end portion 212 of the sieve bed vessel 202 is positioned in the pocket 550 to limit lateral movement of the end portion 212 with respect to the base chassis component 402. The rim 216 of the sieve bed vessel 202 is disposed in the recess 552 of the second chassis component 406 to couple the sieve bed vessel 202 to the second chassis component. The recess 552 is defined by an inner wall 560, an outer wall 562, and an end wall 564. The walls 560, 562 may be configured in any orientation that captures the rim 216. In the example illustrated by FIG. 5, the walls are generally parallel to the sieve bed vessel 202. As such, when the sieve bed vessel 202 is upright, the walls 560, 562 extend downward. The end wall 564 may engage an end 566 of the rim 216. The inner wall 562 extends axially past the end 566 of the rim and into a cavity 568 defined by the rim. The outer wall extends axially along the outer surface of the sieve bed vessel 202.

FIG. 6 illustrates an embodiment similar to the embodiment of FIG. 5 where first chassis component 402 and the second chassis component 406 are coupled together. The coupling of the chassis components 402, 406 captures the sieve bed vessel 202 between the chassis components. The chassis components 402, 406 may be coupled together in a wide variety of different ways. The chassis components may be coupled directly together or the chassis components may be coupled together by one or more intermediate components 600 as illustrated by FIG. 6. The chassis components may be coupled together in any way that the position of the chassis component 406 is fixed relative to the chassis component 402. In the embodiment illustrated by FIG. 6, the sieve bed vessel 202 is captured between the chassis components and supports the chassis component 406 with respect to the chassis component 402. In the example illustrated by FIG. 6, a base component is supported by optional wheels 670 that allow the oxygen concentrator to be moved more easily.

FIG. 7 illustrates an example of an oxygen concentrator arrangement 100 where a pocket 550 is defined by a first chassis component 402, a first recess 552 is defined by a second chassis component 406, and a second recess 552 is defined by a third chassis component 700. The end portion 212 of the sieve bed vessel 202 is positioned in the pocket 550 to limit lateral movement of the end portion 212 with respect to the first chassis component 402. The rim 216 of the sieve bed vessel 202 is disposed in the recess 552 of the second chassis component 406 and the recess 552 of the third chassis component 700 to couple the sieve bed vessel 212 to the second chassis component 406 and the third chassis component 700. In an exemplary embodiment, the second and third chassis components 406, 700 are coupled to the first chassis component 402 to capture the sieve bed vessel 212 between the first chassis component 402 and the second and third chassis components 406, 700. In the embodiment illustrated by FIG. 6, the sieve bed vessel 212 supports the chassis components 406, 700 with respect to the first chassis component 402.

Figure 8:
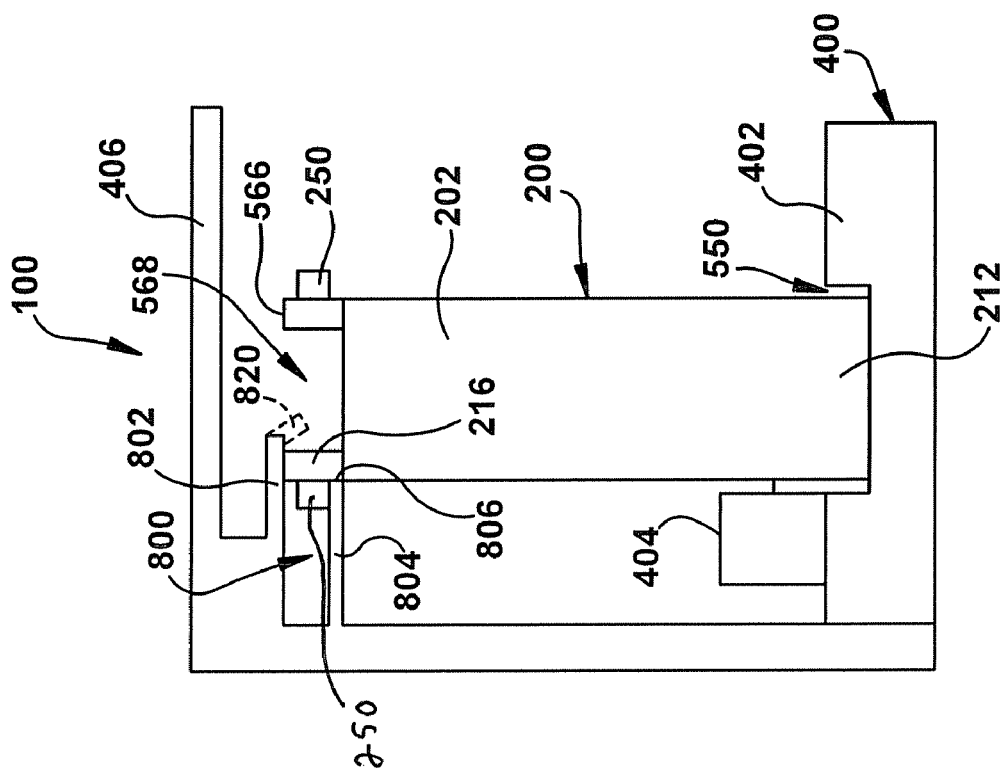
FIG. 8 illustrates an exemplary embodiment of a sieve bed vessel having a rim with a radially extending protrusion disposed in a recess of a chassis component.

FIG. 8 illustrates an embodiment of an oxygen concentrator 100 where a chassis component 406 includes a recess 800 that is configured to accept a rim 216 of a sieve bed vessel that includes a radially extending protrusion 250. The recess 800 is defined by a space between an upper wall 802 and a lower wall 804. An end surface 806 of the lower wall is shaped to fit against an outer surface of the sieve bed vessel in an exemplary embodiment. The upper wall 802 extends over the end 566 of the rim 216. The radially extending protrusion 250 fits between the upper wall 802 and the lower wall 804 to couple the sieve bed vessel to the chassis component. The walls 802, 804 may extend in any direction that couples the rim 216 to the chassis component 406. In the example illustrated by FIG. 8, the walls 802, 804 extend generally parallel to the end surface 566 of the sieve bed vessel 202. When the sieve bed vessel 202 is upright, the walls extend in a generally horizontal direction. Optionally, a protrusion 820 that extends downwardly from the top wall 802 into the cavity 568 defined by the rim may be included to further couple the sieve bed vessel 202 to the chassis component. The chassis component 406 may be coupled to the chassis component 402 to capture the sieve bed vessel between the chassis components.

Figure 9:
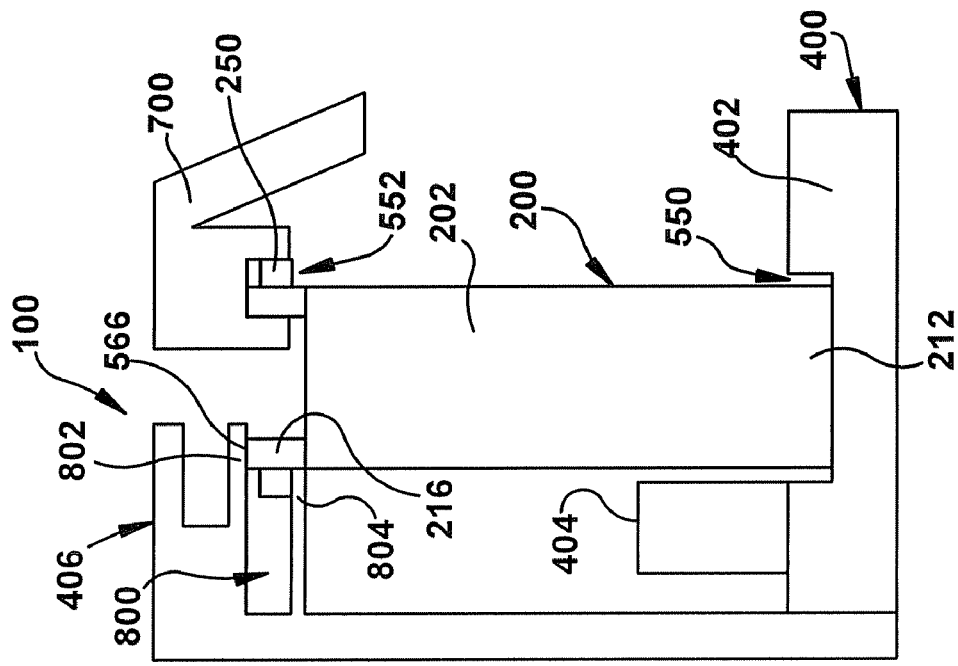
FIG. 9 illustrates an exemplary embodiment of a sieve bed vessel having a rim disposed in a recess of a first chassis component and a radially extending protrusion disposed in a recess of a second chassis component.

FIG. 9 illustrates an embodiment where a pocket 550 is defined by a first chassis component 400, a first recess 800 is defined by a second chassis component 406 and a second recess 552 is defined by a third chassis component 900. In the example illustrated by FIG. 9, the first recess 800 is configured as described with respect to FIG. 8 and the second recess 552 is configured as described with respect to FIG. 5. The second recess 800 is sized to fit over a rim 216 housing a radial projection 250 or bump.

An oxygen concentrator 100 can use a sieve bed vessel 212 as a structural member in a wide variety of different ways. The detailed example of FIGS. 10-22 illustrates just one of the many ways a sieve bed vessel can be used as a structural member in an oxygen concentrator. This patent application is not limited to the specific embodiment illustrated by FIGS. 10-22. Rather, the scope of the application is intended to encompass any claimed use of a sieve bed as a structural component of an oxygen concentrator chassis.

Figure 10:
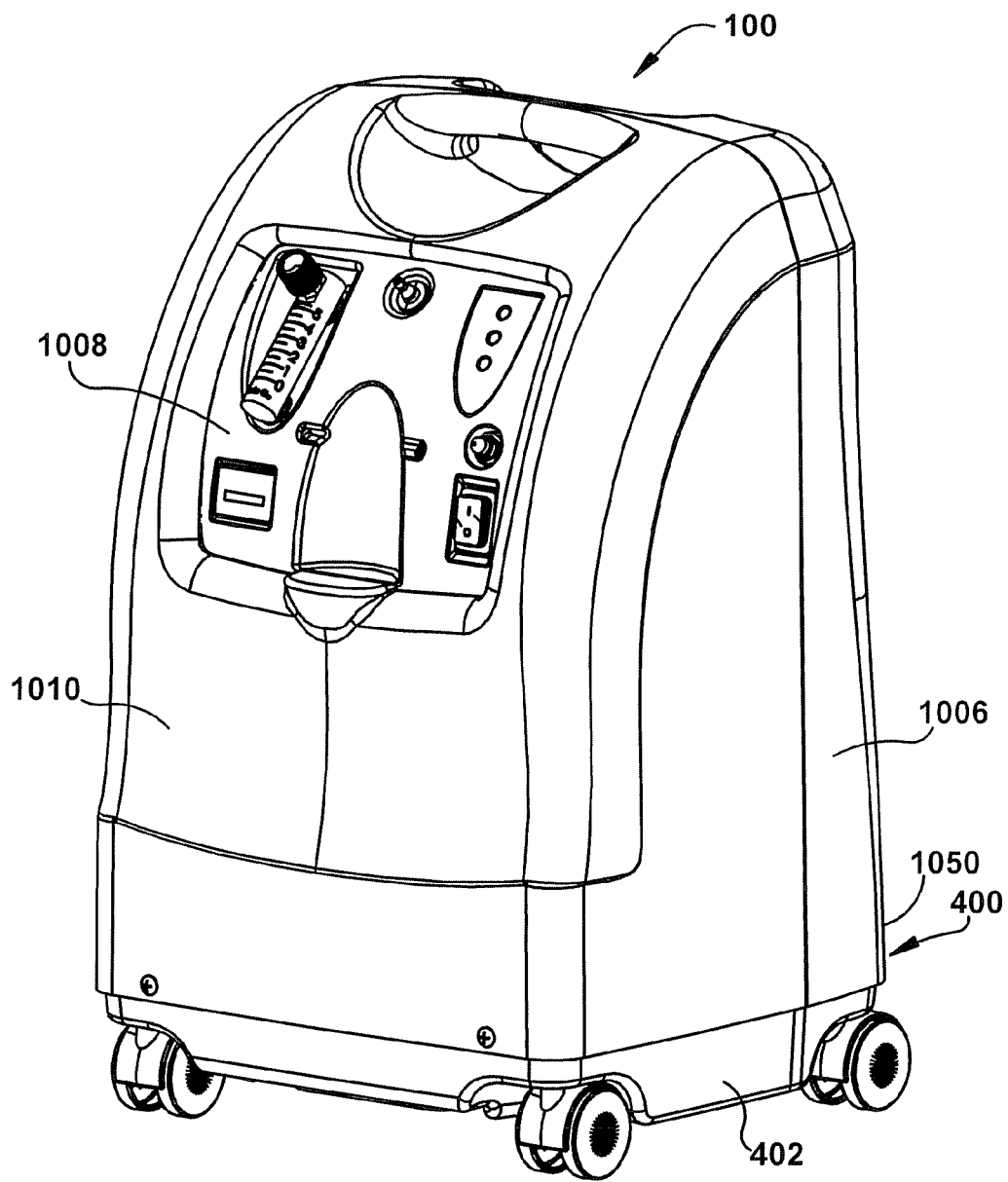
FIG. 10 is a perspective view of an embodiment of an oxygen concentrator.
Figure 11:
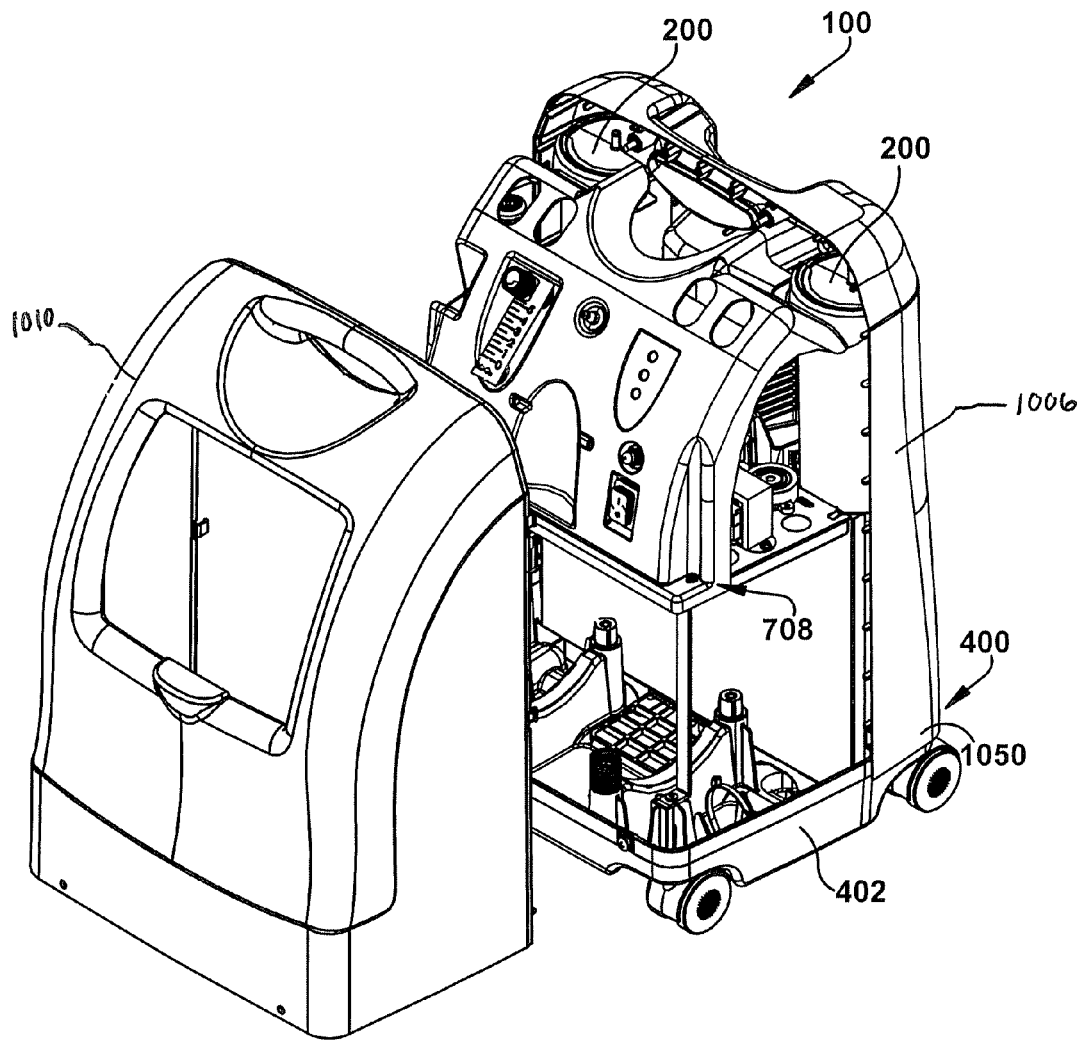
FIG. 11 is a perspective view of the oxygen concentrator illustrated in FIG. 10, with a front cover being removed and many internal components removed.

Referring to FIGS. 10 and 11, the chassis 400 or enclosure of the concentrator 100 includes a base component 402, a rear cover 1006, and a substructure 1008 disposed beneath and supporting a front cover 1010. FIG. 11 illustrates the oxygen concentrator 100 with the front cover 1010 being removed. Most of the internal or "functional devices" are removed to more clearly illustrate the chassis 400.

Figure 12:
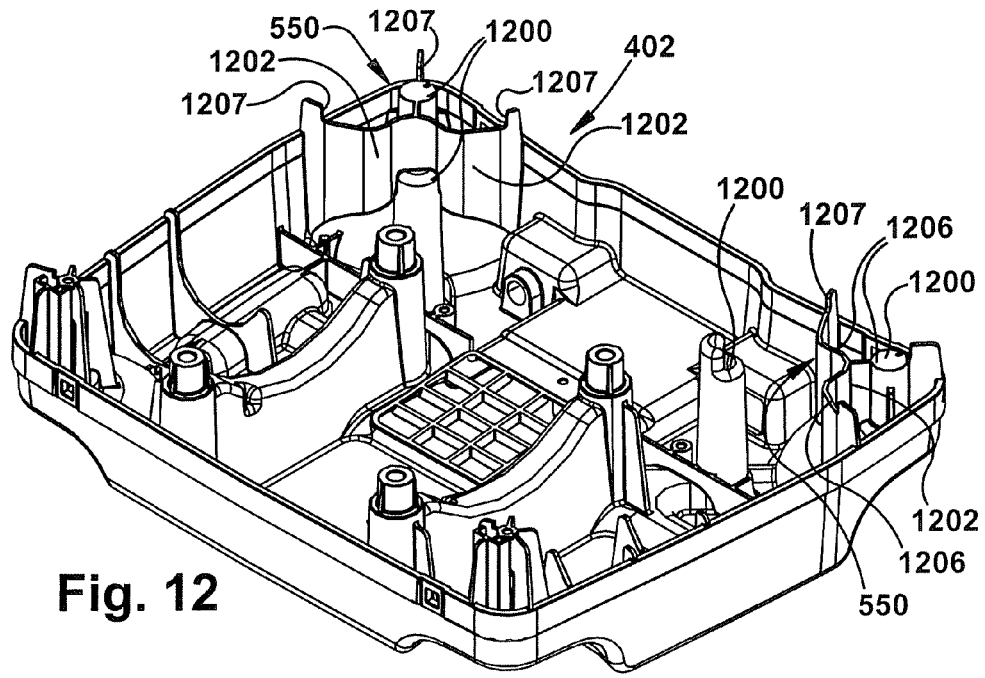
FIG. 12 is a perspective view of one embodiment of an oxygen concentrator base.
Figure 13:
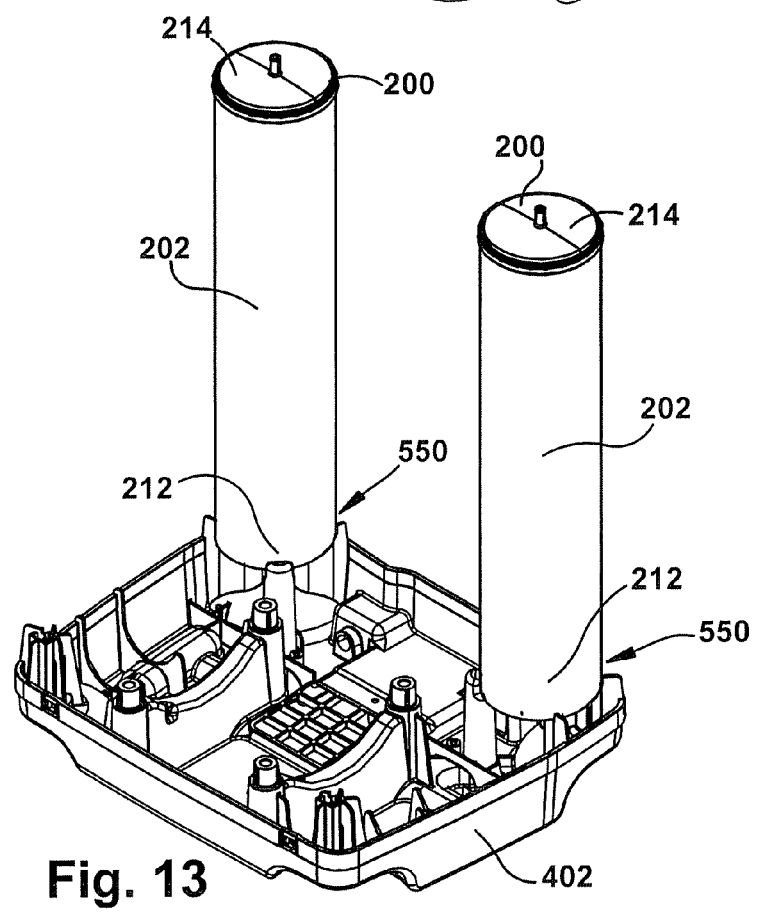
FIG. 13 is a perspective view of one embodiment of sieve bed vessels mounted in recesses in the oxygen concentrator base.
Figure 14:
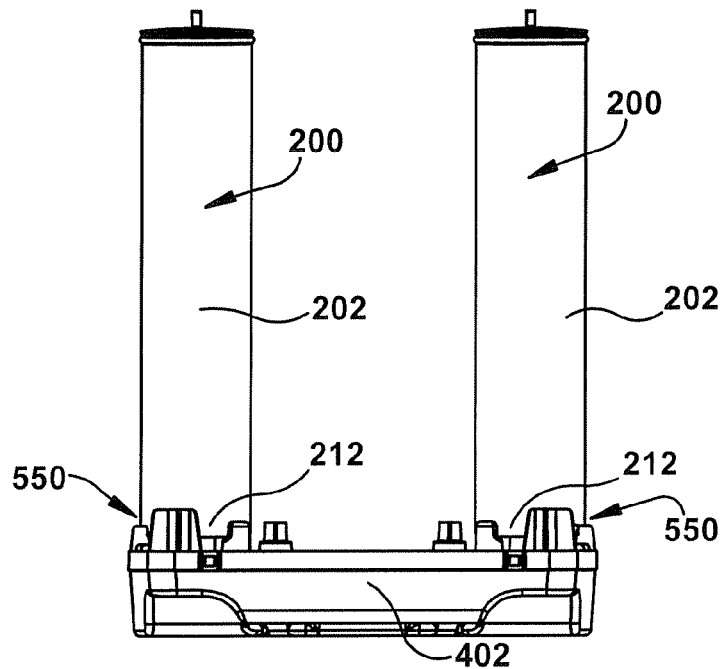
FIG. 14 is a rear view of FIG. 13.

FIG. 12 illustrates the base component 402 with all other components removed. The base 402 includes two recesses or pockets 550. The recesses or pockets 550 can be formed in a wide variety of different ways. In the example illustrated by FIG. 12, the pockets 550 are defined by bosses 1200 and walls 1202. The bosses 1200 and walls 1202 define bottom support surfaces 1206 and lateral support surfaces 1207 that collectively act as a pocket. Referring to FIGS. 13 and 14, end portions 212 of the sieve bed vessels 202 are disposed in the pockets 550. The bottom support surfaces 1206 support the bottoms of the sieve bed vessels, while the lateral support surfaces 1207 inhibit lateral movement of the end portion 212 of the sieve bed vessel 202.

Figure 22:
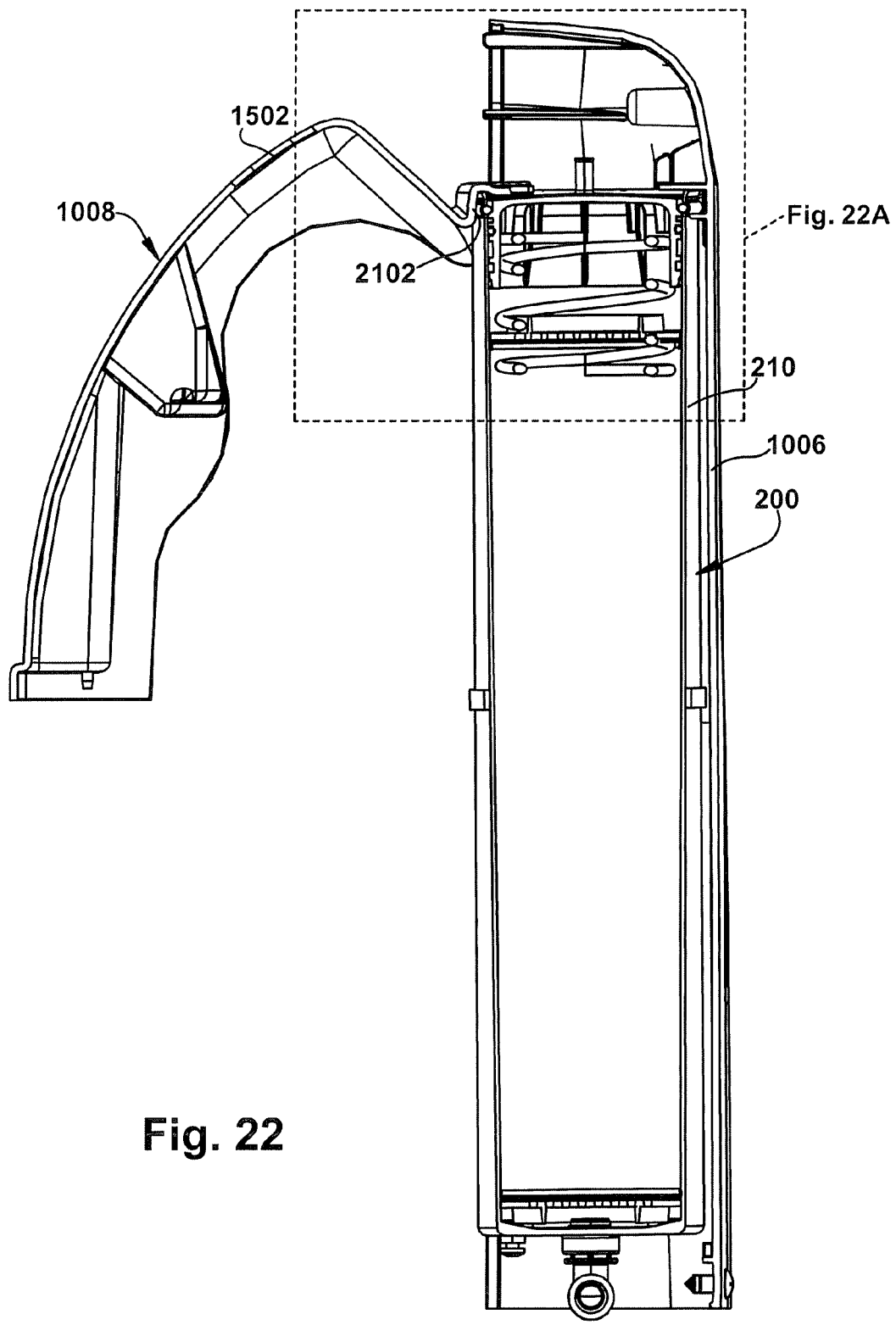
FIG. 22 is a sectional view taken along lines 22-22 in FIG. 17.
Figure 22A:
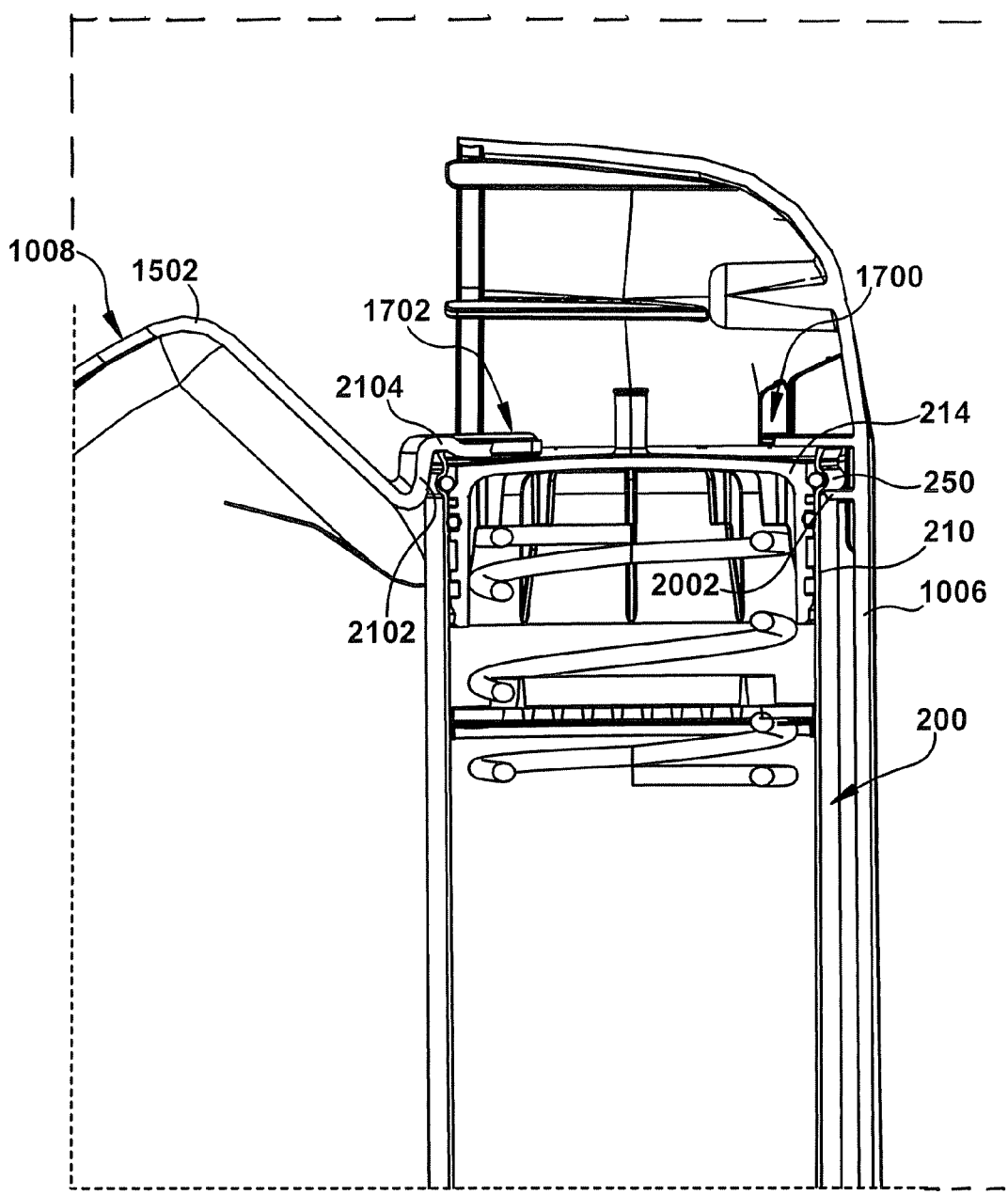
FIG. 22A is an enlarged portion of FIG. 22 as indicated in FIG. 22.

The sieve bed vessels 202 at least partially support the substructure 708 and the rear cover 1006 relative to the base component 402 (See FIGS. 11 and 22A). In the example illustrated by FIG. 20A, the sieve beds 200 include a rim 216 with a radially outward extending bump 250 or protrusion. The bump or protrusion 250 is formed when the end cap 214 is installed at the top end of the sieve bed cylinder. The wall 210 of the sieve bed cylinder is deformed around the end cap 214 to retain the end cap in the cylinder 210. The deformation of the cylindrical wall 210 to retain the cap 214 forms the radially outward extending bump 250.

Figure 15:
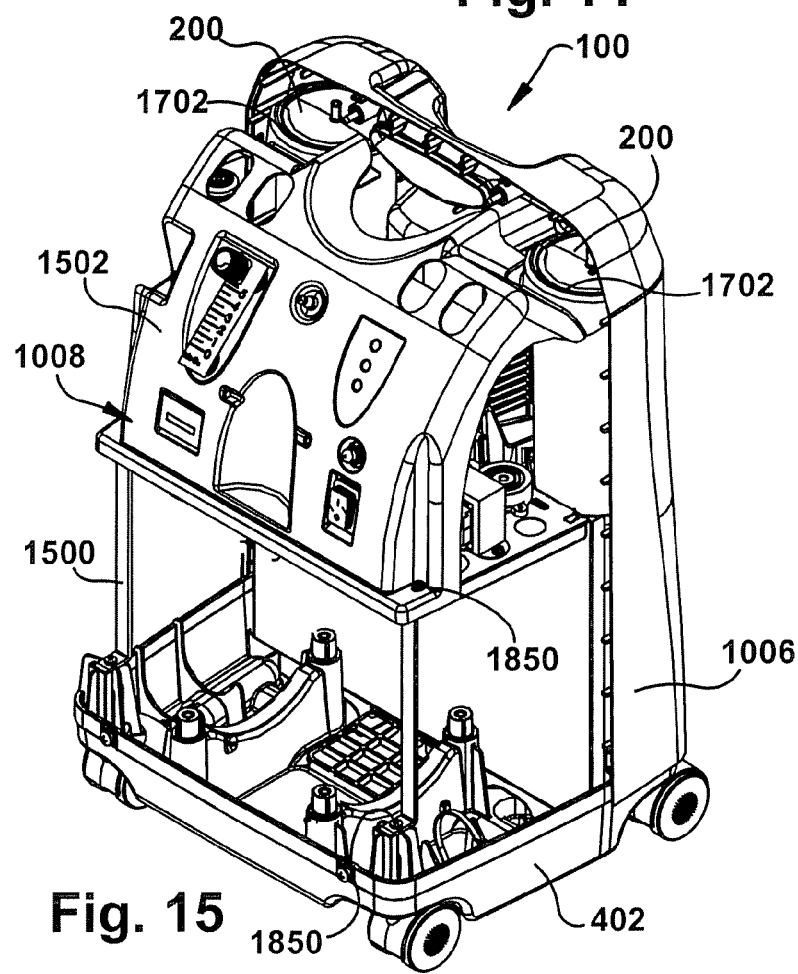
FIG. 15 is a perspective view of the oxygen concentrator illustrated in FIG. 11, with the front cover removed.
Figure 16:
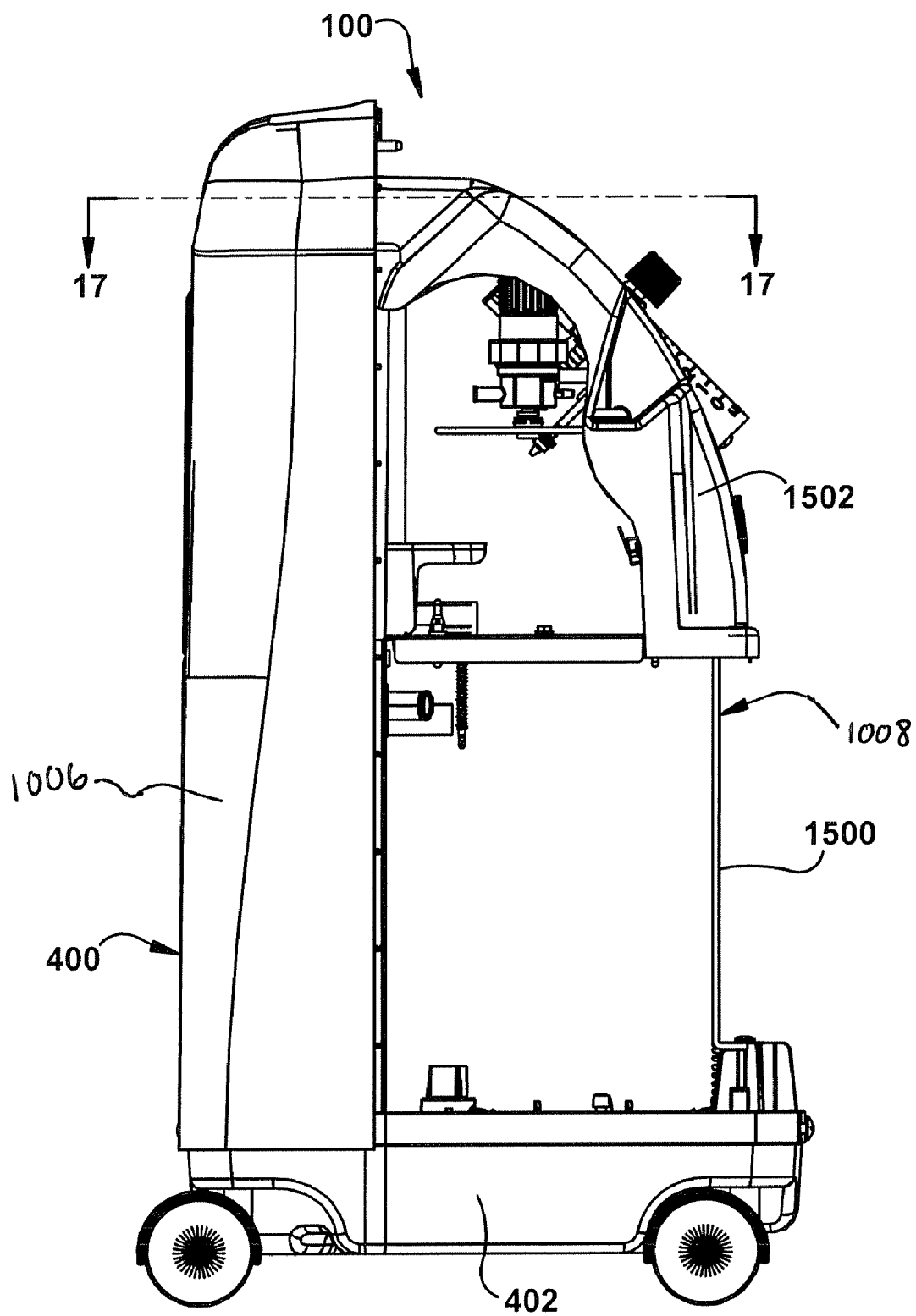
FIG. 16 is a side view of the oxygen concentrator of FIG. 15.
Figure 17:
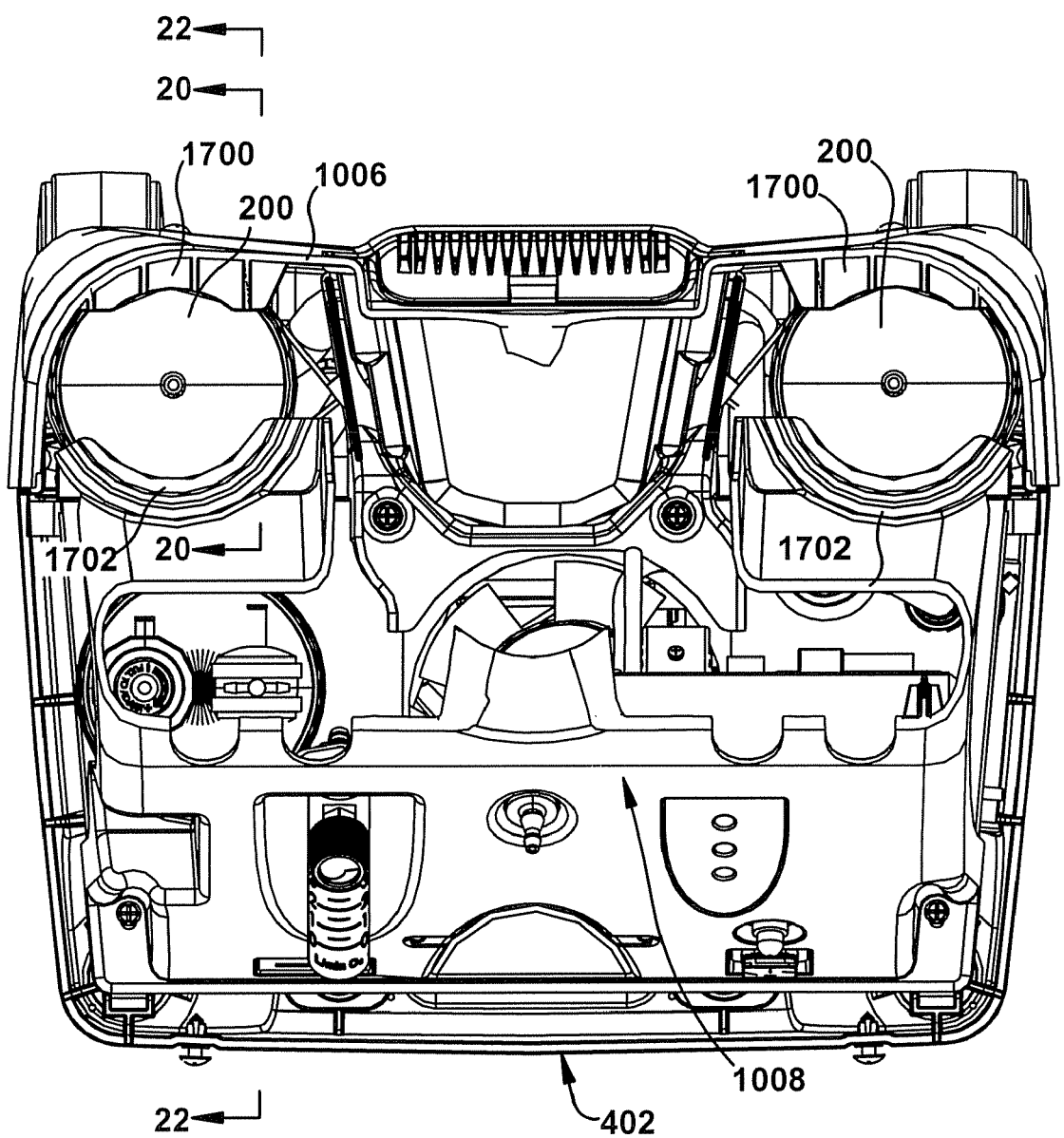
FIG. 17 is a view taken along lines 17-17 in FIG. 16.
Figure 20:
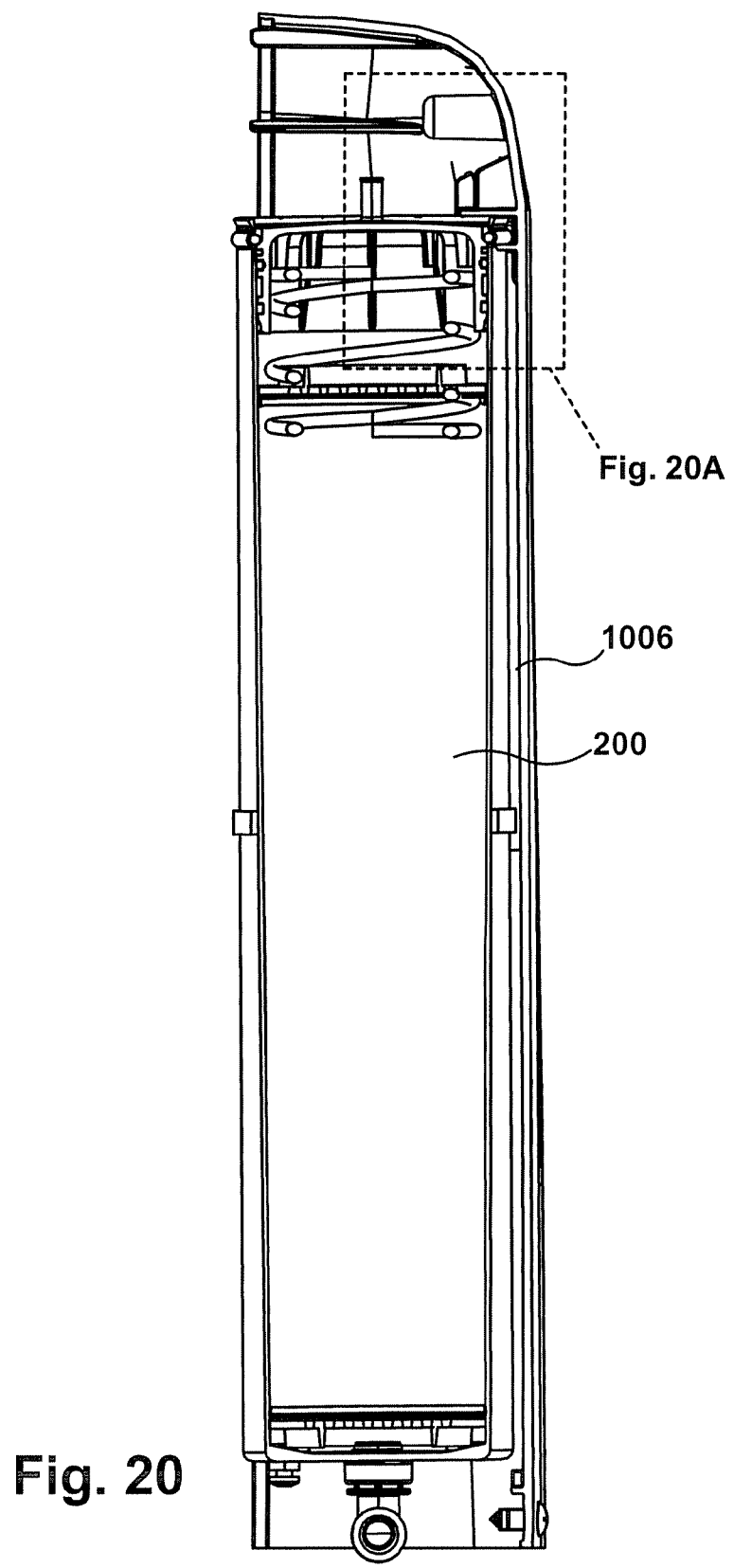
FIG. 20 is a sectional view taken along lines 20-20 in FIG. 17.
Figure 20A:
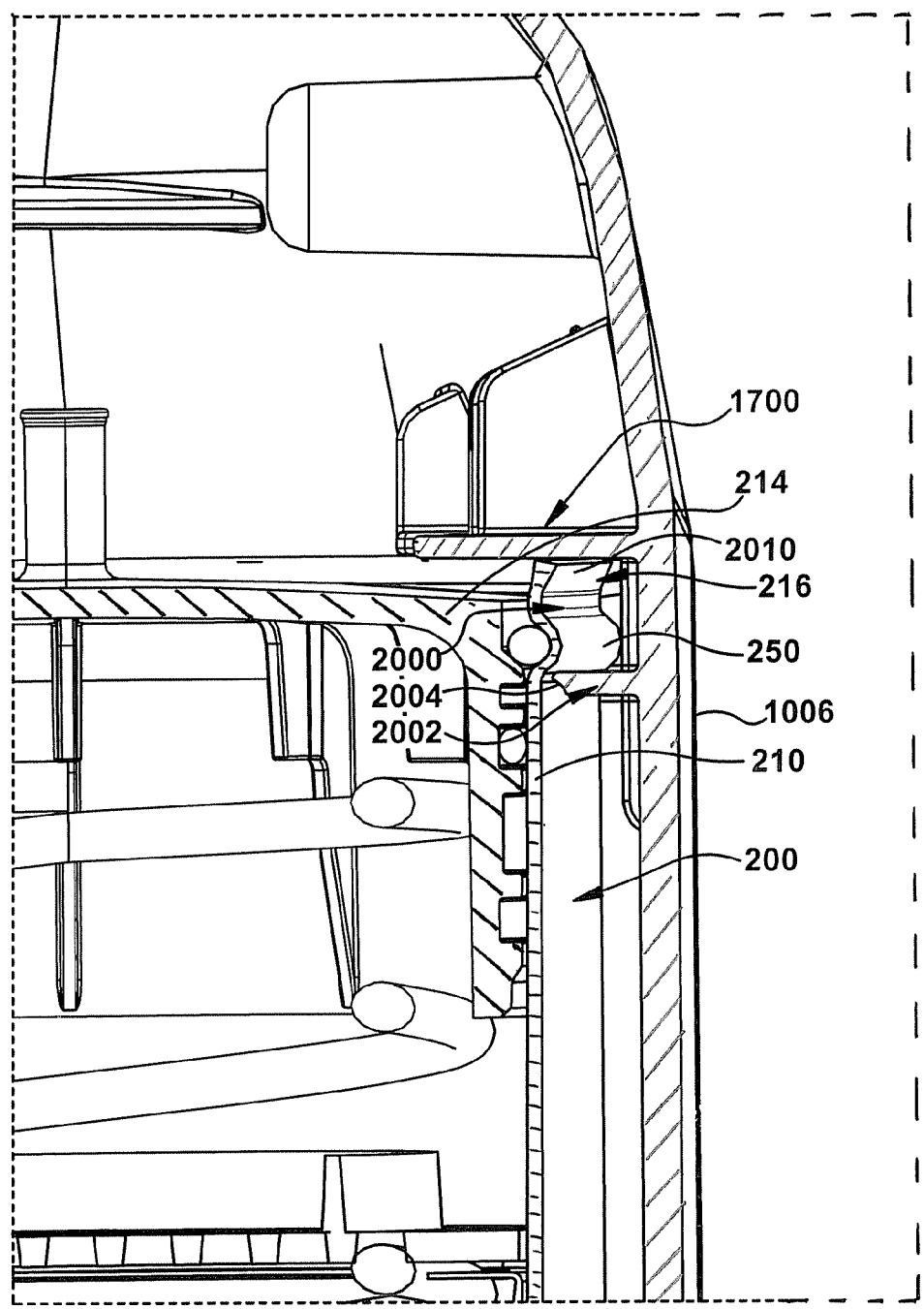
FIG. 20A is an enlarged portion of FIG. 20 as indicated in FIG. 20.

FIGS. 15 and 16 are perspective and side views respectively of the base component 402, the sieve beds 200, the rear cover 1006, and the substructure 1008. The sieve beds 200 support the rear cover 1006 and the substructure 1008 with respect to the base 402. FIG. 17 is a sectional view taken along lines 17-17 in FIG. 16 that shows upper support flanges 1700 of the rear cover 1006 and support flanges 1702 of the substructure 1008. The upper support flanges 1700 rest upon the end 566 of the rim of the sieve bed vessel to support the rear cover 1006 with respect to the base component 402. FIGS. 20 and 20A are sectional views taken along lines 20-20 in FIG. 17 to illustrate a recess 2000 of the rear cover 1006 formed by the upper support flange 1700 and a lower flange 2002. An end surface 2004 of the lower flange 2002 is shaped to fit against the outer cylindrical surface of the sieve bed vessel 202. The radially extending bump 250 fits between the upper flange 1700 and the lower flange 2002. In the embodiment illustrated by FIGS. 20 and 20A, an upper portion 2010 of the rim is bent radially outward and also fits in the recess between the upper and lower flanges. Referring to FIGS. 10 and 11, a bottom portion 1050 of the rear cover is fastened to the base component 402 to capture the sieve bed vessel 202 between the rear cover 1006 and the base component 402.

Figure 18:
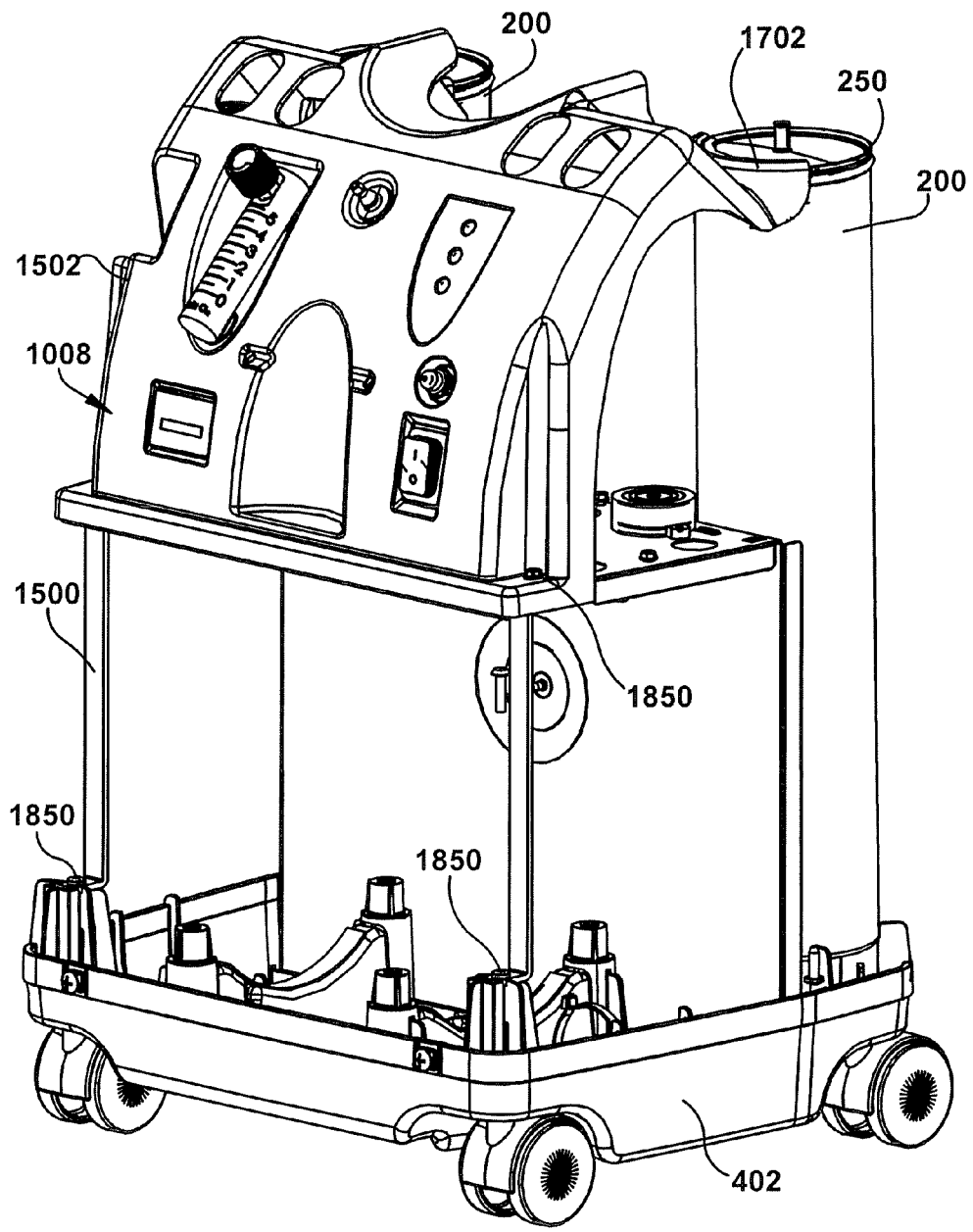
FIG. 18 is a perspective view of the oxygen concentrator of FIG. 15 with a rear cover removed.
Figure 19:
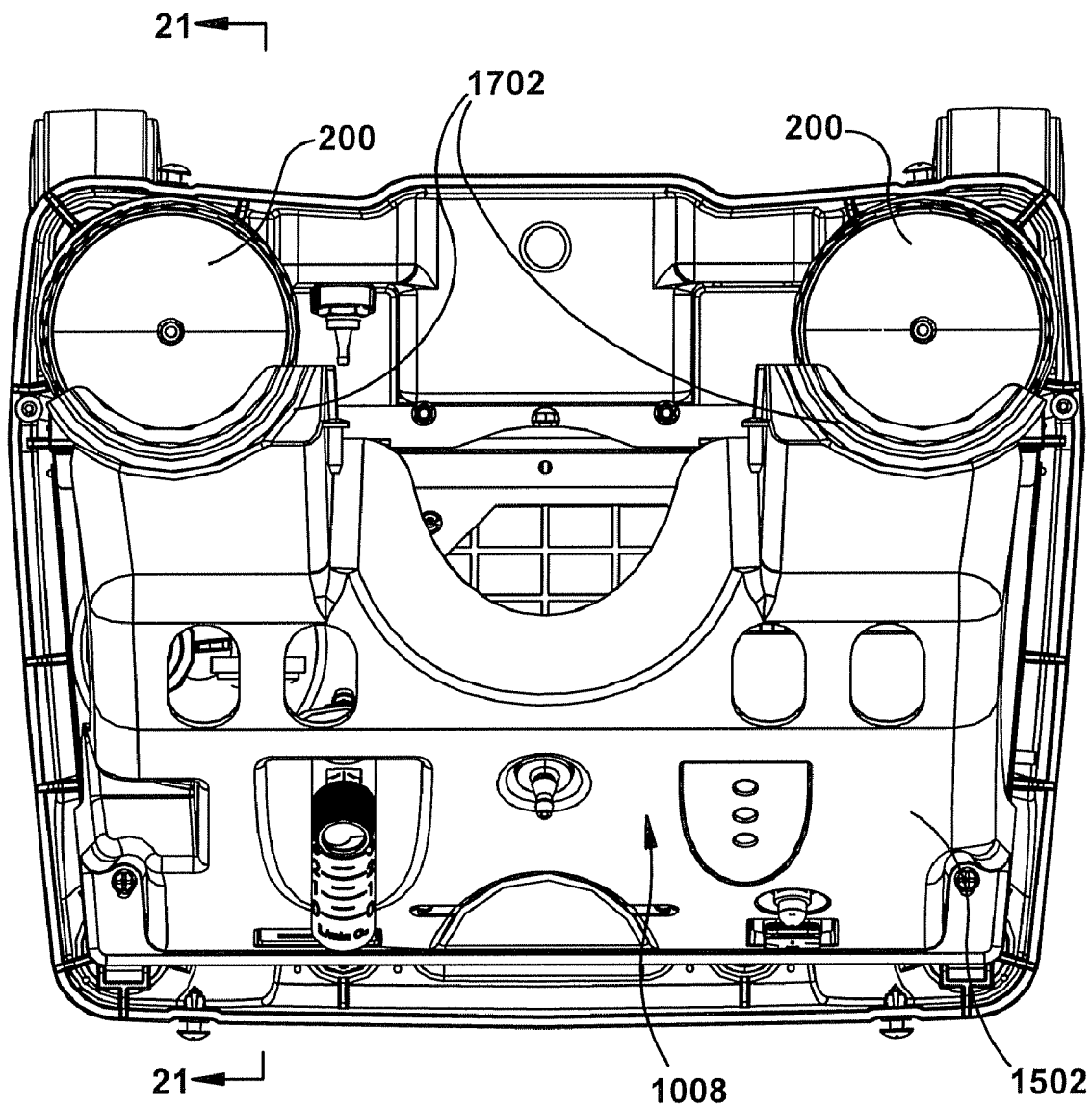
FIG. 19 is a top view of the oxygen concentrator of FIG. 18.
Figure 21:
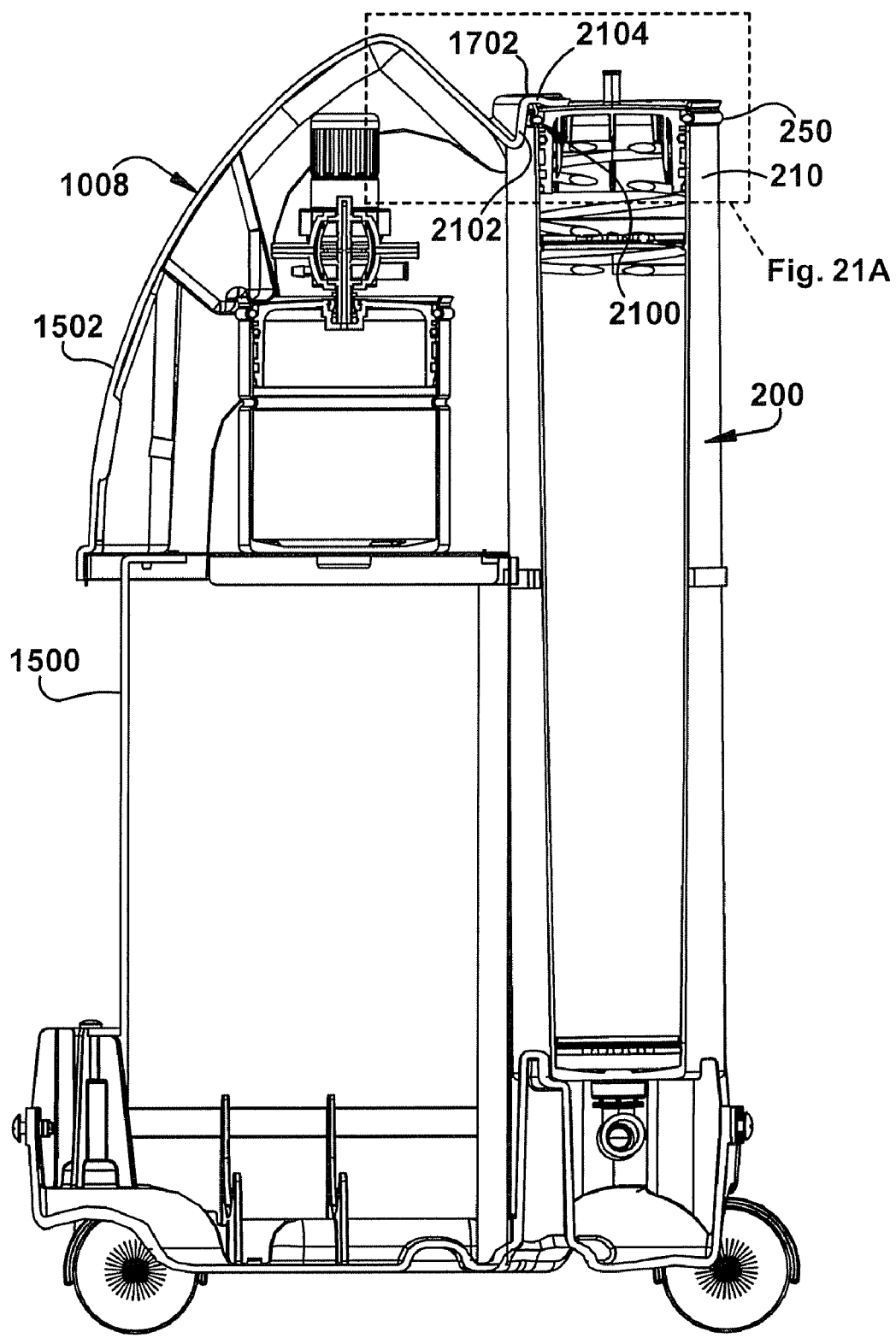
FIG. 21 is a sectional view taken along lines 21-21 in FIG. 19.
Figure 21A:
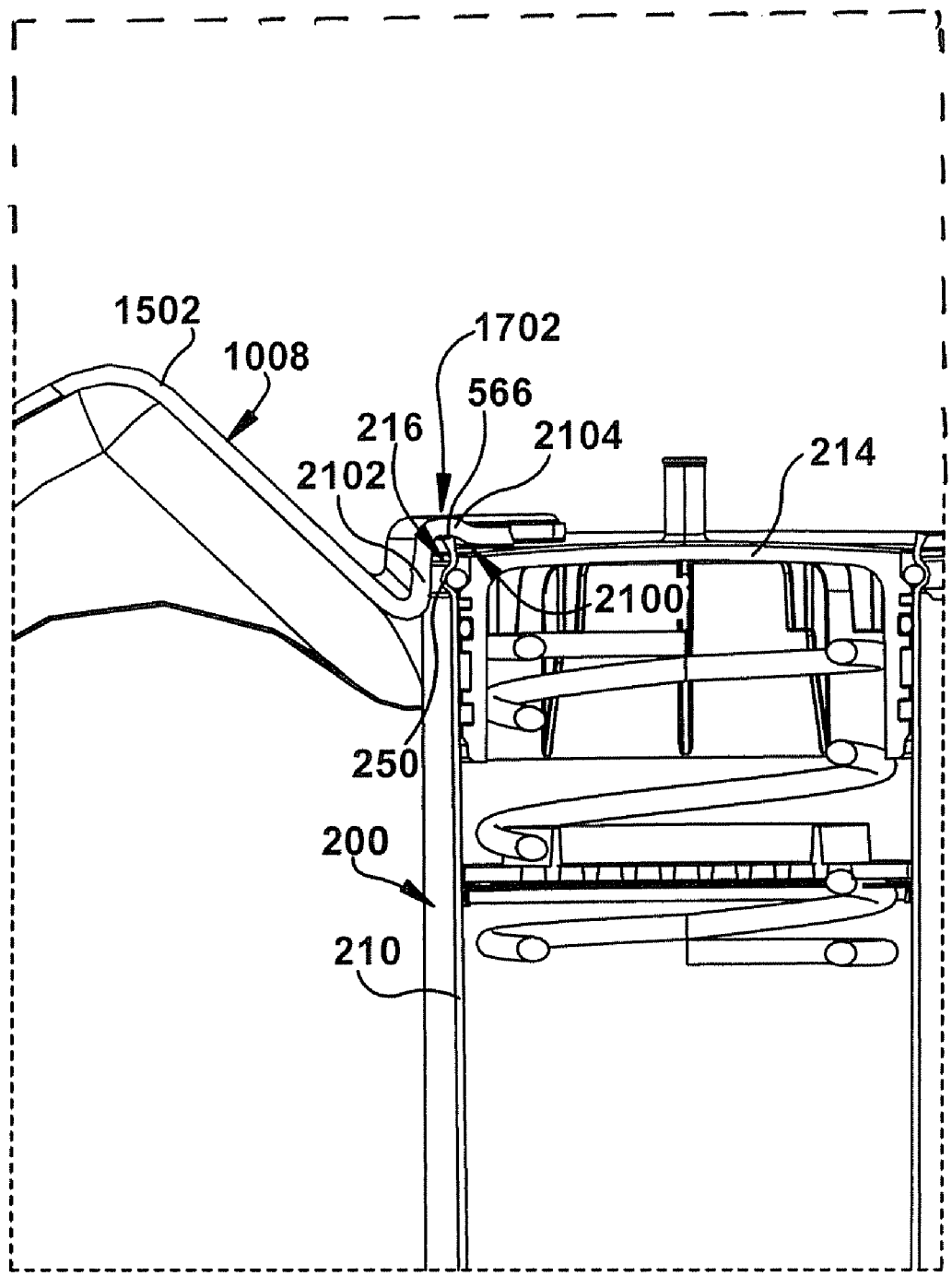
FIG. 21A is an enlarged portion of FIG. 21 as indicated in FIG. 21.

Referring to FIGS. 18 and 19, the substructure 1008 includes a lower frame assembly 1500 and a control panel support member 1502. The control panel support member includes the support flanges 1702. FIGS. 21 and 21A are sectional views taken along lines 21-21 in FIG. 19 to illustrate a recess 2100 of the support flange 1702. The support flanges 1702 engage the rims 216 of the sieve bed vessels such that the sieve bed vessels support the control panel support member 1502. The recess 2100 is defined by a radially outer wall portion 2102 and a contoured or curved wall portion 2104. An axially inner surface of the contoured or curved wall surface 2104 engages an end 566 of the rim 216. The radially outer wall portion extends along the outer cylindrical surface of the sieve bed vessel.

Referring to FIG. 18, the lower frame assembly 1500 is attached to the control panel support member 1502 and the base component 402 with fasteners 1850. As such, the sieve bed vessel is captured between the control panel support member 1502 and the base component 402 while the sieve beds 200 provide support for the control panel support member.

FIGS. 22 and 22A is a sectional view that illustrates how the upper end of the sieve bed vessel is constrained between the rear cover 1006 and the control panel support member 1502, while providing support for the rear cover and control panel support member. Referring to FIG. 10, the front cover 1010 is fastened to the rear cover 1010 and the base 402 to secure the positions of the rear cover 1006 and the substructure 1008 with respect to the base component in the exemplary embodiment. Once the front cover is assembled, the sieve bed vessels are completely constrained by the rear cover 1006, the control panel support member 1008 and the base component 402.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

The invention claimed is:

1. A concentrator for providing a breathing gas comprising:
   a base component that includes a sieve bed pocket;
   a sieve bed comprising a cylindrical vessel filled with an oxygen separation medium, wherein a first end of the cylindrical vessel is disposed in said sieve bed pocket to couple the cylindrical vessel to the base component;
   a cover component that includes at least one support flange that defines a recess, wherein a rim of said cylindrical vessel is disposed in the recess of the support flange to couple the cover to the cylindrical vessel.

2. The concentrator of claim 1 further comprising a control panel that includes a support flange that defines a recess, wherein said rim of the cylindrical vessel is disposed in the recess of control panel support flange to couple the control panel to the cylindrical vessel.

3. The concentrator of claim 1 wherein the rim comprises a radially extending projection.

4. The concentrator of claim 3 wherein the radially extending projection is disposed in said recess.

5. The concentrator of claim 4 wherein the recess is defined as a space between a pair of substantially horizontally extending walls.

6. The concentrator of claim 4 wherein the recess is defined as a space between a pair of walls that extend substantially parallel to a top plate of the cylindrical vessel.

7. The concentrator of claim 1 further comprising a second sieve bed coupled to the base component and the cover component.

8. The concentrator of claim 1 wherein the sieve bed pocket comprises bosses and walls that provide support for the first end of the sieve bed cylinder and limit lateral movement of said sieve bed cylinder with respect to the base component.

9. The concentrator of claim 1 wherein the base component and the cover component are secured together, such that the cylindrical vessel is captured between the base component and the cover component and the cylindrical vessel supports the cover component with respect to the base component.

10. The concentrator of claim 1 wherein the cylindrical vessel comprises a metal vessel.

11. The concentrator of claim 1 wherein the cylindrical vessel comprises an aluminum vessel.

* * * * *